(12) United States Patent
Krig

(10) Patent No.: US 9,536,345 B2
(45) Date of Patent: Jan. 3, 2017

(54) APPARATUS FOR ENHANCEMENT OF 3-D IMAGES USING DEPTH MAPPING AND LIGHT SOURCE SYNTHESIS

(71) Applicant: Intel Corporation, Santa Clara, CA (US)

(72) Inventor: Scott A. Krig, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 13/727,504

(22) Filed: Dec. 26, 2012

(65) Prior Publication Data

US 2014/0176535 A1    Jun. 26, 2014

(51) Int. Cl.
| | | |
|---|---|---|
| G06T 15/50 | (2011.01) | |
| G06T 15/04 | (2011.01) | |
| G06T 19/20 | (2011.01) | |
| G06T 17/00 | (2006.01) | |

(52) U.S. Cl.
CPC ............. *G06T 15/04* (2013.01); *G06T 15/50* (2013.01); *G06T 17/00* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 6,252,976 B1 * | 6/2001 | Schildkraut et al. | 382/117 |
| 6,636,627 B1 * | 10/2003 | Oosawa | 382/154 |
| 6,654,013 B1 * | 11/2003 | Malzbender et al. | 345/426 |
| 6,677,942 B1 * | 1/2004 | Rushmeier et al. | 345/420 |
| 6,728,401 B1 * | 4/2004 | Hardeberg | G06K 9/0061 348/370 |
| 7,042,452 B1 * | 5/2006 | Wasserman | G06T 11/203 345/419 |
| 7,091,973 B1 * | 8/2006 | Cohen | 345/426 |
| 8,090,222 B1 * | 1/2012 | Baluja et al. | 382/305 |
| 8,405,680 B1 * | 3/2013 | Cardoso Lopes | G06T 15/50 345/426 |

(Continued)

FOREIGN PATENT DOCUMENTS

| | | |
|---|---|---|
| JP | 04361386 A | 12/1992 |
| JP | 08096137 A | 4/1996 |

(Continued)

OTHER PUBLICATIONS

Francken et al., High Quality Mesostructure Acquisition Using Specularities, 2008, Computer Vision and Pattern Recognition, pp. 1-7.*

(Continued)

*Primary Examiner* — Anh-Tuan V Nguyen
(74) *Attorney, Agent, or Firm* — International IP Law Group, P.L.L.C.

(57) ABSTRACT

An apparatus for enhancing a 3-D image illuminated by a light source and having associated depth and texture information includes generating from the depth information a surface mesh having surface mesh sections. Texture sections corresponding to the surface mesh sections are determined from the texture information. The texture sections are ranked based upon their color intensity, and the characteristics of one or more light sources are adjusted to alter the color intensity of the ranked texture sections to thereby produce an enhanced image.

29 Claims, 8 Drawing Sheets

(56) References Cited

U.S. PATENT DOCUMENTS

| | | | |
|---|---|---|---|
| 8,436,853 B1* | 5/2013 | Hickman et al. | 345/419 |
| 2002/0150306 A1* | 10/2002 | Baron | H04N 5/2354 |
| | | | 382/275 |
| 2004/0252892 A1* | 12/2004 | Yamauchi et al. | 382/232 |
| 2005/0012963 A1* | 1/2005 | Yamads | 358/2.1 |
| 2005/0248571 A1* | 11/2005 | McTaggart | G06T 15/506 |
| | | | 345/426 |
| 2005/0254720 A1 | 11/2005 | Tan et al. | |
| 2006/0152507 A1 | 7/2006 | Lee et al. | |
| 2006/0181543 A1* | 8/2006 | Katsumata | G01J 3/28 |
| | | | 345/589 |
| 2006/0244757 A1* | 11/2006 | Fang | G06T 15/04 |
| | | | 345/582 |
| 2007/0273686 A1 | 11/2007 | Watanabe et al. | |
| 2008/0080785 A1* | 4/2008 | Ford | G06K 9/40 |
| | | | 382/275 |
| 2009/0103831 A1* | 4/2009 | Nakamura et al. | 382/274 |
| 2009/0110322 A1* | 4/2009 | Hadap et al. | 382/274 |
| 2009/0303247 A1* | 12/2009 | Zhang et al. | 345/594 |
| 2009/0322795 A1* | 12/2009 | Vasquez et al. | 345/690 |
| 2010/0045676 A1* | 2/2010 | Wyborn | G06T 15/50 |
| | | | 345/426 |
| 2010/0097407 A1* | 4/2010 | Zulch | 345/690 |
| 2010/0303344 A1* | 12/2010 | Sato | G06T 7/0081 |
| | | | 382/162 |
| 2010/0328677 A1* | 12/2010 | Debevec et al. | 356/600 |
| 2011/0164811 A1* | 7/2011 | Ishiyama | G06K 9/00241 |
| | | | 382/154 |
| 2011/0211047 A1* | 9/2011 | Chhibber | A61B 5/0059 |
| | | | 348/47 |
| 2012/0293615 A1 | 11/2012 | Chen et al. | |
| 2012/0307028 A1* | 12/2012 | Kanamori | A61B 1/00009 |
| | | | 348/65 |
| 2013/0021340 A1* | 1/2013 | Shim | G06T 7/408 |
| | | | 345/420 |
| 2013/0070986 A1* | 3/2013 | Peleg et al. | 382/128 |
| 2013/0077829 A1* | 3/2013 | Cramblitt | G06T 5/10 |
| | | | 382/104 |
| 2013/0088612 A1* | 4/2013 | Imai | H04N 5/2254 |
| | | | 348/222.1 |
| 2014/0063269 A1 | 3/2014 | Krig | |
| 2014/0092439 A1 | 4/2014 | Krig | |

FOREIGN PATENT DOCUMENTS

| | | |
|---|---|---|
| JP | 2004094917 A | 3/2004 |
| JP | 2007004318 A | 1/2007 |
| WO | 2012/112866 A1 | 8/2012 |
| WO | 2014/105542 A1 | 7/2014 |

OTHER PUBLICATIONS

International Search Report and Written Opinion received for PCT Patent Application No. PCT/US2013/075930, mailed on Mar. 31, 2014, 10 pages.

Csakany et al., Relighting of Facial Images, IEEE Computer Society, 2006, 6 pages.

EPO Search Report, EP Application No. 1386654, date of completion Jul. 6, 2016, 6 pages.

* cited by examiner

200

APPARATUS FOR ENHANCEMENT OF 3-D IMAGES USING DEPTH MAPPING AND LIGHT SOURCE SYNTHESIS

TECHNICAL FIELD

The present invention relates generally to enhancement of three-dimensional digital images.

BACKGROUND ART

The proliferation of three-dimensional (3-D) stereo cameras and related depth sensing methods, along with 3D printers and 3-D display devices has created a new set of challenges in regard to the processing and enhancement of 3-D images. More particularly, the quality of captured 3-D images may suffer from the effects of sub-optimal lighting conditions existing at the time of capture, such as glare or dimly lit regions. Although standard computer graphics methods may be used to enhance the 3D images and change lighting effects, provided that the 3D depth information from surfaces of objects in the images is provided, there are currently no suitable standardized methods by which such captured images can be enhanced to change 3-D lighting, or to reduce or remove the effects of sub-optimal lighting conditions.

There are various techniques that may be used during image capture that also capture depth information associated with image texture information. The depth information is processed to produce a point cloud or a depth map with a three dimensional (3D) polygonal mesh that defines the shape of 3D objects within the image. After processing, the depth information may be represented in several formats, including, but not limited to, an X, Y, and Z point cloud in a 3D space or a 3D surface mesh of triangles or quadrilaterals. Other formats for representing depth information can include an XML encoded format, a textual format, or a graphical format such as OpenGL.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As generally discussed above, when a 3-D image is captured by a 3-D stereo camera, depth sensor, multi-view camera, stereo satellite, other depth-capturing imaging device, or depth-capturing method, such as, for example, the methods of Simultaneous Localization and Mapping (SLAM) or Light (often Laser) Detection and Ranging, depth information may be extracted and processed along with the associated texture information. For example, structured light patterns may be broadcast into a scene, and the depth information may be reconstructed by detecting the size of the patterns, as the structured light patterns change with distance. In other examples, a time of flight (TOF) sensor may be used to gather information by measuring the round trip time of flight of an infrared light from the sensor, to an object, and back. The extracted depth information may be encoded along with the associated texture information, and used with any media CODEC format or encoded in a new codec format.

The terms image texture and texture are used synonymously to describe a 2-D image array which represents colors on the surface. Using computer graphics techniques, the image textures are texture mapped. Texture mapping is the process of fitting an image over a polygon mesh containing the geometry of the surface. Accordingly, during texture mapping, a set of textures is fitted geometrically and warped over a polygon mesh, similar to a rubber sheet being stretched over an irregular surface and glued down the surface. In this manner, the surface geometry is represented as a polygon mesh that is separate from the actual colors or image texture on the surface.

Figure 2:
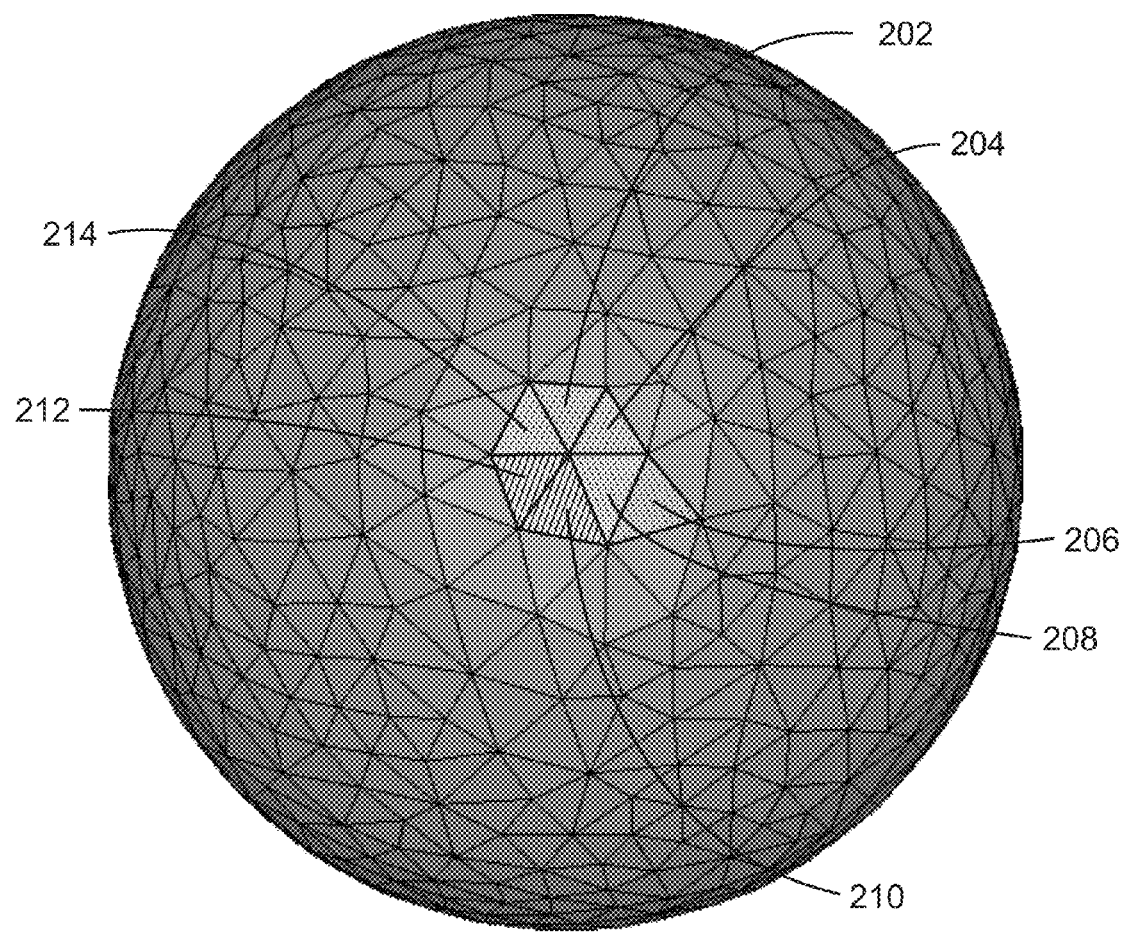
FIG. 2 shows an exemplary surface mesh of a sphere that is subdivided into a plurality of triangular surfaces, in accordance with embodiments.

Further, the terms surface mesh section, surface patch, surface mesh, surface polygon, and polygon patch may be used interchangeably to describe surface geometry in terms of triangles, quadrilaterals, or other polygons connected into a mesh defining an entire surface as shown in embodiments. For example, FIG. 2 illustrates a triangle mesh representation of the surface geometry.

By adopting the above described representation of images by separating the surface geometry from the surface color or image texture, the present techniques provide can recover and determine the original light source position vectors and light source color in the original scene using vector analysis and color space intensity ranking for each image texture. The present techniques may also change the lighting in the scene in subsequent renderings using by subtracting or changing the original lighting and adding new light sources with new colors into the rendering. As described herein, the terms image and scene may be used interchangeably.

The extracted depth information is sufficient to enable, using now known or future developed methods, the creation of a 3-D surface mesh or depth map composed of 3-D points, surface vectors, or geometric shapes, such as, for example, triangles, quadrilaterals, etc. However, the format of the depth information and the associated image texture information is not standardized. The lack of a standardized method of sending depth information and the associated image texture information can prevent the use of depth information in a variety of applications, such as using lighting information to allow for depth based lighting corrections or enhancements in scenes. Accordingly, embodiments described herein relate to enhancement of lighting information within 3-D images using a standardized depth map format and associated texture information which may be rendered using graphics processing units and standard computer graphics methods such as openGL or Microsoft™ DirectX® to render the polygon meshes and associated image textures in standard computing systems. The standardized depth map format and texture information may be used with any media CODEC format or encoded in a new codec format. By enabling 3-D depth maps to include a light surface color intensity ranking for each triangle or quadrilateral in the mesh in a standardized format, colorimetric adjustments can be made to the image or scene. One skilled in the art will recognize that standard computer graphics methods can be used to make unlimited lighting adjustments on textured 3D polygon meshes given the surface color-intensity ranking and light source determinations made using the methods of this invention, which may be embodied on standard computer systems such as tablets, phones, eye mounted display computers, laptops or desktop systems. Thus, lighting adjustments can be made on the 3D depth images and corresponding textures.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
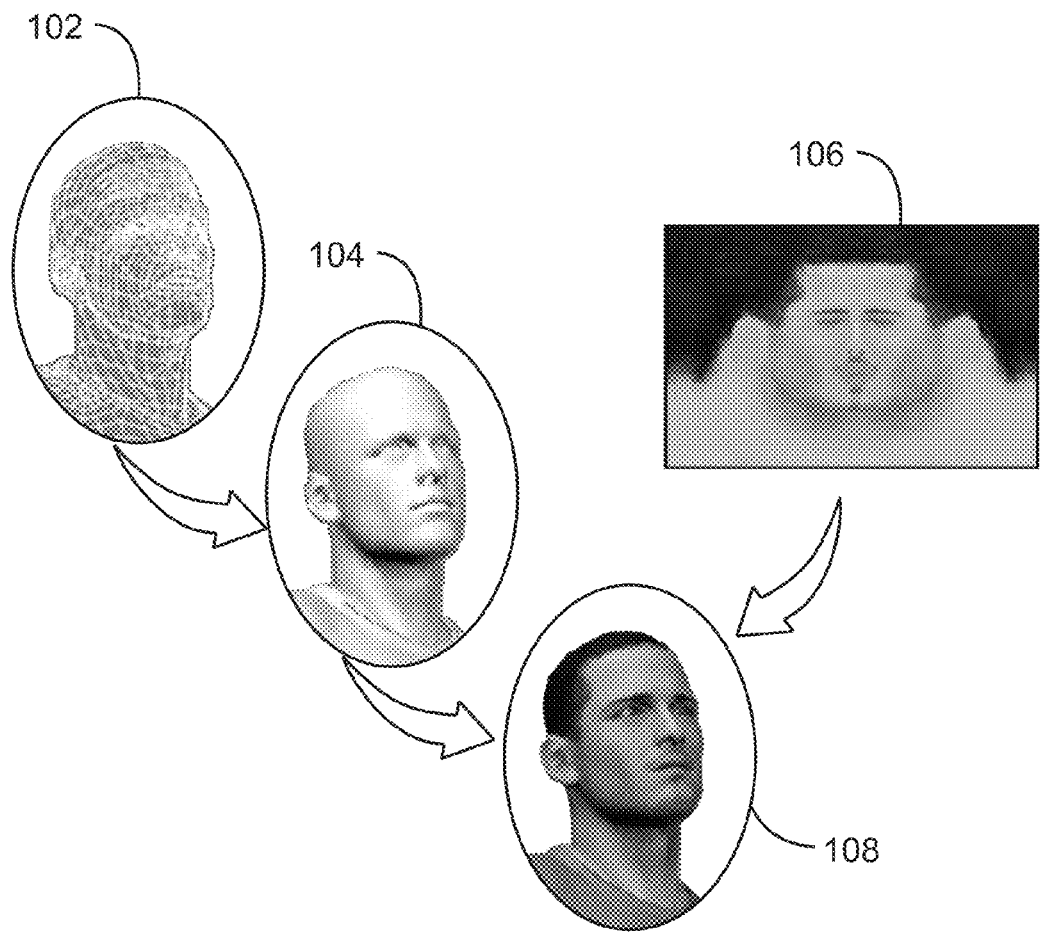
FIG. 1 shows an exemplary 3-D polygonal mesh with surfaces, lighting and textures are applied, in accordance with embodiments.

FIG. 1 shows an exemplary 3-D polygonal mesh 102 with surfaces, lighting and textures are applied, in accordance with embodiments. The 3-D polygonal mesh 102 forms the structure of a human face. The polygonal mesh includes vertices, lines, edges, and faces that are used to define the shape of the 3D object, specifically, a human face. Any type of mesh may be used in accordance with the present techniques. For example, the mesh may be a quadrilateral mesh or triangular mesh. Further, alternative depth formats may also be used in accordance with embodiments. For example, since a mesh is composed of points within a 3-D space, the depth information may also be considered a 3-D point cloud. Furthermore, the mesh may be encoded as a depth map in a 2-D array where the array values indicate the depth of each point.

The polygonal mesh 102 may include a plurality of control points. A control point is a position within the polygonal mesh 102 that includes corresponding information such as color, normal vectors and texture coordinates. The texture coordinates may be used to link the control point to texture information, such as a texture map. The texture information adds details, colors, or image texture information to the triangular mesh.

An Image may be applied or texture-mapped onto surface polygon mesh 102 to thereby produce image 104. The surface polygonal mesh 102 shows the form of a human face when the textures are applied over each surface polygon. Although the polygonal mesh 102 and the corresponding textures applied resulting in the image 104 have been described in the context of rendering a 3D image, 2D images may also be rendered using the present techniques. In any event, rendering an image using polygonal meshes and corresponding textures may be accomplished using a graphics pipeline in conjunction with a standard graphics or media encoding format such as OpenGL, DirectX, H.264, MPEG-4, and VC-1 and any other media CODEC format.

Additional lighting and textures may be applied to further refine the image 104, which results in the image 108. Lighting has been applied to the image 108 that results in a slight shadow on the neck from the chin of the human face in the image 108. An unwrapped texture map 106 shows the texture information from the image 108 without any lighting applied. In embodiments, the lighting on the image 108 can be changed to reduce or eliminate the shadow on the neck from the chin of the human face in the image 108.

FIG. 2 shows an exemplary surface mesh 200 of a sphere that is subdivided into a plurality of triangular surfaces 202,

204, 206 . . . , 214, etc., in accordance with embodiments. However, it is to be understood that a surface mesh may be subdivided using, for example, 3-D points, surface vectors, or surfaces having other geometric shapes. Each of the surfaces (e.g., 202, 204, 206, . . . , 214, etc.) of surface mesh 200 corresponds to a section of the texture image (not shown) of the exemplary sphere. The color intensity of each of the texture image sections may be determined and ranked by intensity in a color space, such as, for example, HSL (hue, saturation and lightness), HSV (hue, saturation and value), YUV or other suitable method for determining and ranking color intensity. By sorting surfaces and ranking them by color intensity, the actual scene lighting may be recovered using vector analysis of the surface normal of each surface with the viewing position plane surface normal, which yields the direction of the light source vectors, which is useful for relighting the mesh. The texture image sections having high levels of color intensity correspond to sections of surface mesh 200 having high levels of specular reflection from a light source to the viewing position, and thus may indicate areas of bright lighting useful for determining the light source vector direction and color, and the light source information is useful in order to change the lighting effects using standard computer graphics methods. Conversely, the texture image sections having low levels of color intensity correspond to sections of surface mesh 200 having low levels of specular reflection from a light source to the viewing position, and thus may indicate areas of low or dim lighting. Thus, the texture image sections may be ranked from high to low color intensity in order to determine actual scene lighting direction vectors and light source color.

Maximum light reflection occurs when the surface normal vector N is half-way between the viewing (image capture device) vector V and the light source vector L. The half-way normal vector information of a surface may be used to calculate the light source vector given knowledge of the viewing vector V which defines the position of the camera. The high-ranking color-intensity surfaces and their corresponding surface normal vectors from the polygon mesh are used together as set to compute an approximation of the light source vector L for a given image. In an embodiment, the light source vector L may be recovered and determined from the original 3-D surface geometry data and corresponding image texture patches for each surface and then a best estimate of the original light source vector is chosen based on the surface normals N from the polygon in the mesh corresponding to the highest color intensities, or the light source vector L may otherwise be derived from a weighted or computed mathematical combination of a set of light source vectors L computed for each surface normal N, such as an average of L vectors, median L vector, linear regression of L vectors, or other mathematical method. Thus, the light source(s) may be located in 3-D space. As is more particularly described hereinafter, the set of color-intensity ranked surfaces and their corresponding normal vectors may then be used to adjust, add or take away, enhance, change the color of or otherwise alter the lighting of captured 3-D images, and the color-intensity ranked set of surface normal vectors, image textures, and associated polygons may be encoded in a standard coded format or other regular data format in a file, communications stream, memory or other data structure.

Figure 3:
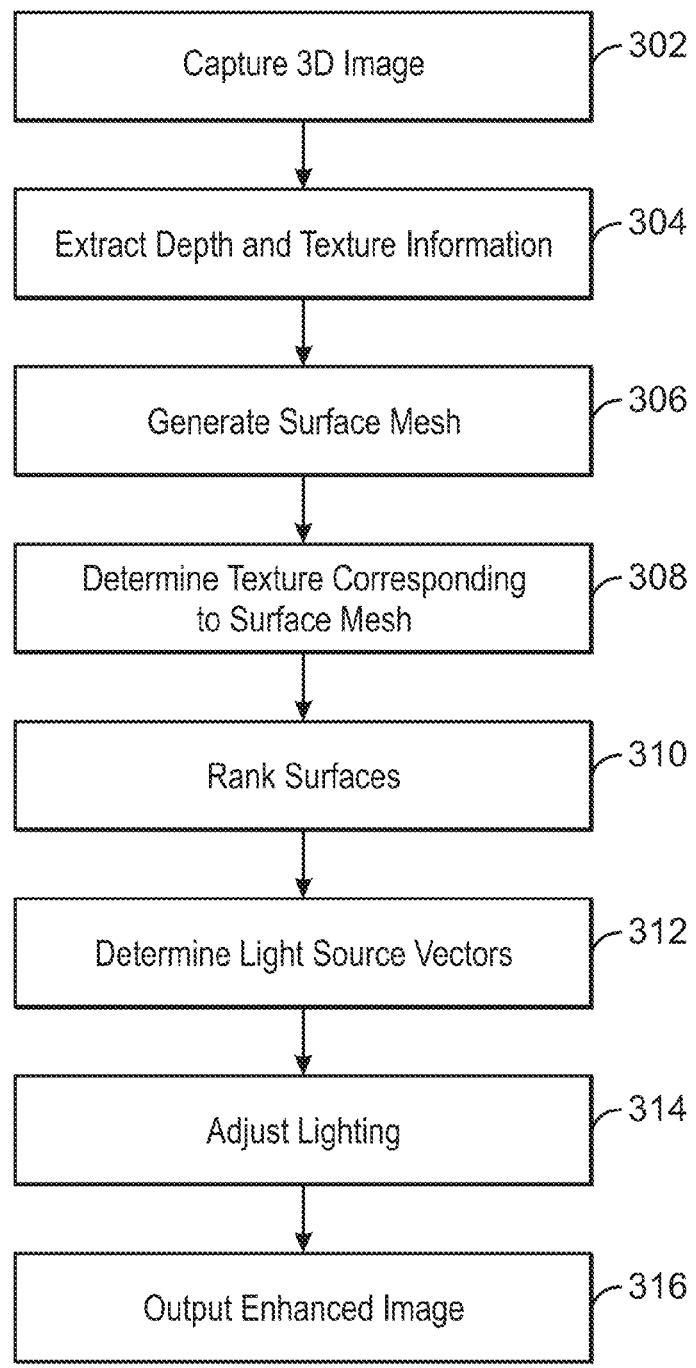
FIG. 3 is a process flow diagram showing a method for enhancing 3-D images, in accordance with embodiments.

FIG. 3 is a process flow diagram showing a method 300 for enhancing 3-D images, in accordance with embodiments. In various embodiments, the method 300 provides an enhanced 3-D image. In some embodiments, the method 300 may be executed on a computing or other electronic device, as will be more particularly described hereinafter. Method 300 includes capturing 3-D image 302, extracting depth and texture information from the 3-D image 304, generating surface mesh 306, determine texture sections corresponding to surface mesh sections 308, ranking surfaces 310, determining light source vectors 312, adjusting lighting 314, and output enhanced image 316.

At block 302, a 3-D image is captured using a 3-D stereo camera, depth sensor, multi-view camera, stereo satellite, other depth-capturing imaging device, or depth-capturing method, such as, for example, the methods of Simultaneous Localization and Mapping (SLAM) or Light (typically Laser) Detection and Ranging, or otherwise being provided with a source 3-D image. Extracting depth and texture information 304 may include extracting or otherwise determining the depth or texture maps from the captured 3-D image data.

At block 306, a surface mesh, such as exemplary surface mesh 200, is generated utilizing the extracted depth information, which surface mesh may then be partitioned into surface mesh sections as previously described. As noted above, surface mesh sections may be of any desired geometric shape, including triangles, quadrilaterals, etc., 3-D points and surface vectors.

At block 208, the texture section corresponding to the each surface mesh section is determined. For example, for each individual surface mesh section 202-214 of surface mesh 200 the corresponding texture image section of the 3-D image depth or texture map is determined.

At block 310, the texture image sections are ranked in terms of color intensity, which corresponds to ranking the specular reflection of each of the individual surfaces of the surface mesh 200, as is described above. Thus, the surfaces may be ranked from highest to lowest color intensity.

At block 312, the light source vectors are determined, which includes determining the half-way normal vectors for each, or a desired subset, of the individual texture image sections. In one embodiment, the highest-ranking individual texture image section and the corresponding half-way normal vector of that surface may be used to determine the light source vector via known vector methods to thereby determine the location of the light source in 3-D space, which allows for subsequent changes to the lighting of each surface texture to a new set of light sources using standard computer graphics methods for surface lighting. In other embodiments, the texture image sections having a color-intensity ranking above a predetermined threshold and the normal vectors corresponding to those surfaces are mathematically combined together as groups into a best estimate of the true light source vector, and the resulting best estimate of the half-way normal vector may be used to determine location the light source vector via known vector methods to thereby determine the position of the light source in 3-D space. In still other embodiments, the light source vectors determined for each of the texture image sections having a ranking above a predetermined threshold may be mathematically combined together in groups to determine an best estimate of the original light source vector and, thereby, the position of the light source in 3-D. In an embodiment, the light source vector L may be chosen based on the surface normal N from the polygon in the mesh corresponding to the highest color intensity, or the light source vector L may otherwise be derived from a weighted or computed combination of a set of light source vectors L computed for each surface normal N, such as an average of L vectors, median L vector, linear regression of L vectors, or other mathematical method.

At block 314, the properties or characteristics of the light source are adjusted, which may generally include, but is not limited to, adjusting the brightness, color (i.e., hue, saturation, chroma, etc.), color intensity or luminance of the light, and adding and removing light sources. More particularly, in one exemplary embodiment, the lighting on one or more of the texture image sections having a color intensity ranking above a predetermined threshold is adjusted by decreasing the color intensity of the one or more surfaces to effectively remove light or provide anti-light, which may be useful for removing glare in one embodiment, or increasing lighting of a dark surface by adding light from a new position using standard computer graphics methods. In another exemplary embodiment, the lighting of one or more of the texture image sections having a color intensity ranking below a predetermined threshold is adjusted by increasing the color intensity of the one or more surfaces. In yet another exemplary embodiment, the foregoing embodiments may be combined to decrease the lighting of one or more of the texture image sections having a color intensity ranking above a predetermined threshold by decreasing the color intensity of those one or more surfaces, and adding lighting to one or more of the texture image sections having a color intensity ranking below a predetermined threshold by increasing the color intensity of those one or more surfaces. In yet another exemplary embodiment, which may be similarly combined with the preceding or subsequent embodiments described herein, one or more light sources may be added by adding a position vector having an associated light source color, which added light source may be directed generally to all surfaces or selectively to certain surfaces, such as, for example, surfaces having a color intensity equal to, greater than, or less than a predetermined threshold. Thus, an enhanced image may be created. All of the embodiments can be embodied in and utilize using standard computer graphics methods.

The adjustment of the properties or characteristics of the light source performed at block 314 may, in embodiments, also include removing any light sources present in the 3-D image when captured by projecting "anti-light". As used herein, "anti-light" includes altering the color intensity on all or selected texture image section(s). Adding "anti-light" removes light from the texture image sections. The adjustment of the properties or characteristics of the light source performed at block 314 may, in the same or other embodiments, further adding new light sources into the 3-D image, using interactive controls to adjust lighting characteristics, adding synthetic light source information into standard video encoding formats, adjusting lighting characteristics by using standard GPU graphics pipelines to add/remove lighting effects, and using digital light metering and adjustments in camera systems.

At block 316, an enhanced image is output, which may include rending the enhanced image on a display device or via 2-D or 3-D printing. In another embodiment, the enhanced image may be output by saving the enhanced image as a computer-readable file, such as, for example, a media format file, to computer-readable memory, such as, for example, a hard disk drive, memory stick, SD card, random access memory, read only memory, or any other form of electronic storage now known or later devised. Further, outputting the enhanced image may also include providing the set of color-intensity ranked surfaces in a predetermined or standard format, such as, for example, a surface mesh composed of triangles or other geometric shapes with corresponding texture surfaces, a standard depth map format such as point clouds, Z images or 2D pixel arrays with the pixel value corresponding to the depth or Z dimension, or a standard camera image sensor output format such as a subset of the MIPI standard, to thereby enable initial or additional lighting adjustment to be performed downstream prior to or in conjunction with rendering of the enhanced image.

The process flow diagram of FIG. 3 is not intended to indicate that the blocks of method 300 are to be executed in any particular order, or that all of the blocks are to be executed or included in every embodiment. Further, any number of additional blocks may be included within the method 300, depending on the details of the particular implementation.

Figure 4A:
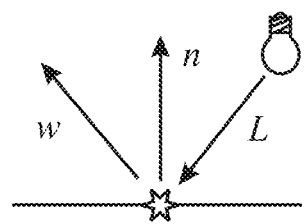
FIGS. 4A-C generally illustrate light vectors for light, viewer/camera, reflection, specular highlights and surface normal, in accordance with embodiments.
Figure 4B:
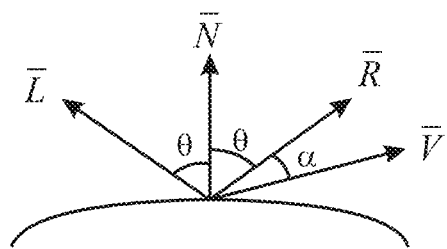
Figure 4C:
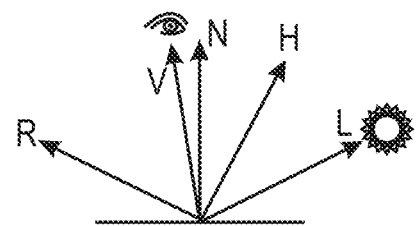

FIGS. 4A-C generally illustrate light vectors for light, viewer/camera, reflection, specular highlights and surface normal, in accordance with embodiments. More particularly, FIG. 4A shows the half-way normal vector "n" is determined to be half-way between a source vector L of a light source and the viewing vector "w". As previously described, the half-way vector is the vector at which maximum reflection of the light source is observed. FIG. 4B shows the viewing vector V, the surface normal vector N, light source vector L and the reflection vector R for a non-flat surface. FIG. 4C illustrates the relationship between the light source vector L, the viewing vector V, the mirror reflection vector R of light source vector L, the smooth surface normal vector N, and the half-angle vector H which is the half-way vector between vectors L and V.

Figure 5:
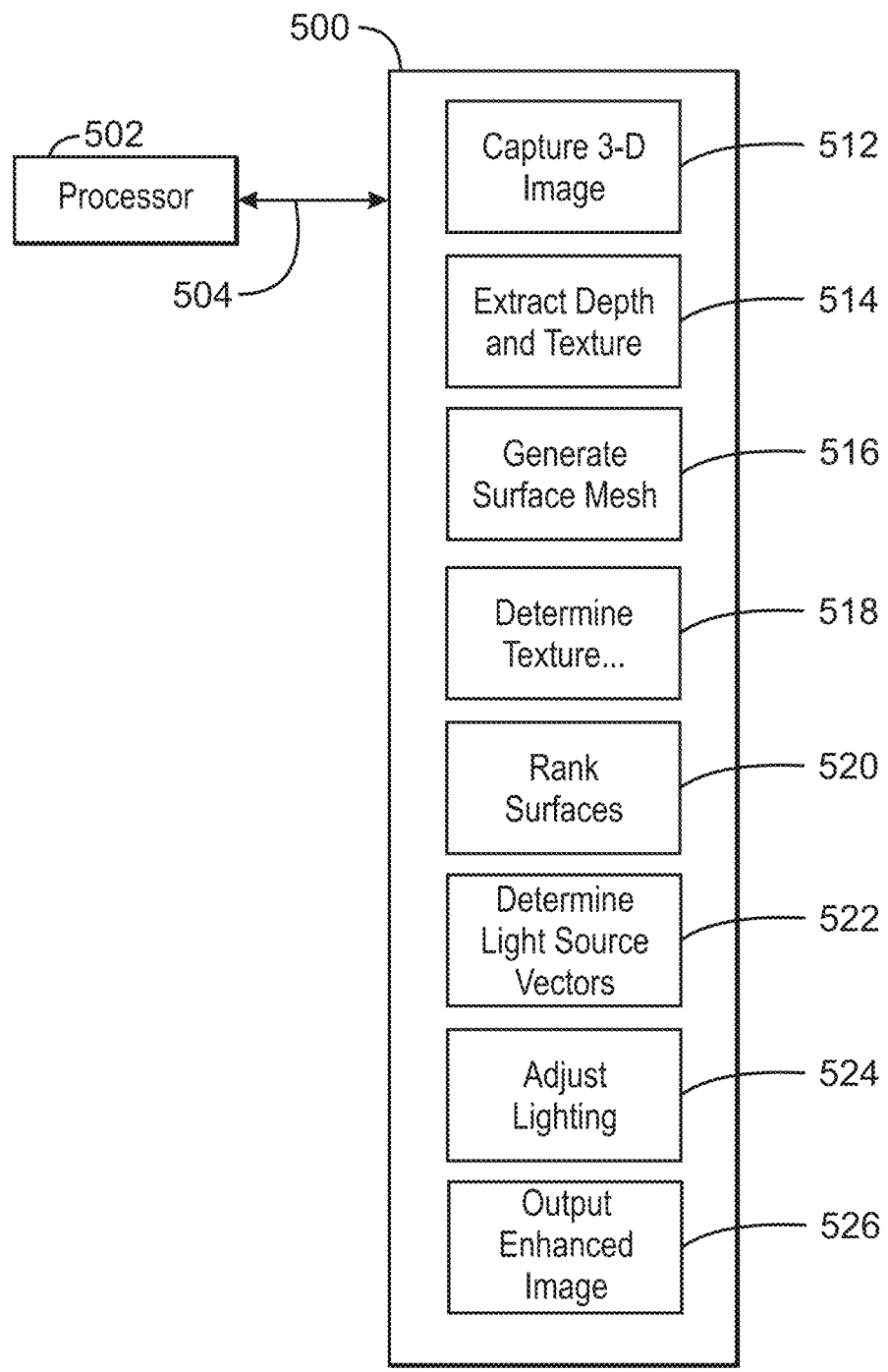
FIG. 5 is a block diagram showing a tangible, non-transitory computer-readable media storing code for enhancing 3-D images, in accordance with embodiments.

FIG. 5 is a block diagram showing a tangible, non-transitory computer-readable media 500 storing code for enhancing 3-D images, in accordance with embodiments. The tangible, non-transitory computer-readable media 500 may be accessed by a processor 502 over a signal bus 504. Furthermore, the media 500 may include code configured to direct the processor 502 to perform the methods described herein, and particularly method 300. Media 500 may store various software components or modules, including components or modules corresponding to the processes of method 300 illustrated in FIG. 3. For example, media 500 may include a capturing 3-D image module 512 that may be configured to capture, import or otherwise obtain or receive a 3-D image. Media 500 may also include an extracting depth and texture information module 514 configured to extract or otherwise determine the depth and texture maps of the 3-D image. Media 500 may also include a generating surface mesh module 516 that may be configured to generate a surface mesh of the 3-D image. Media 500 may further include a determine texture sections corresponding to surface mesh sections module 518 that may be configured to determine for each surface mesh section the corresponding texture section. Media 500 may still further include a ranking surfaces module 520 that may be configured to rank the surfaces in regard to at least one of color intensity and specular reflection. Media 500 may yet further include a determining light source vectors module 522 that may be configured to determine the light source vector to thereby locate the light source in 3-D space. Media 500 may also include an adjusting lighting module 524 that may be configured to adjust the characteristics of the light source(s) of the 3-D image, as is more particularly described above in regard to method 300. Media 500 may also include an output enhanced image module 526 that may be configured to output an enhanced image and associated data, such as a set of color-intensity ranked surfaces and associated textures.

The block diagram of FIG. 5 is not intended to indicate that the tangible, non-transitory computer-readable media 500 is to include all of the components shown therein.

Further, the tangible, non-transitory computer-readable media 500 may include any number of additional components not shown in FIG. 5, depending on the details of the specific implementation.

Figure 6:
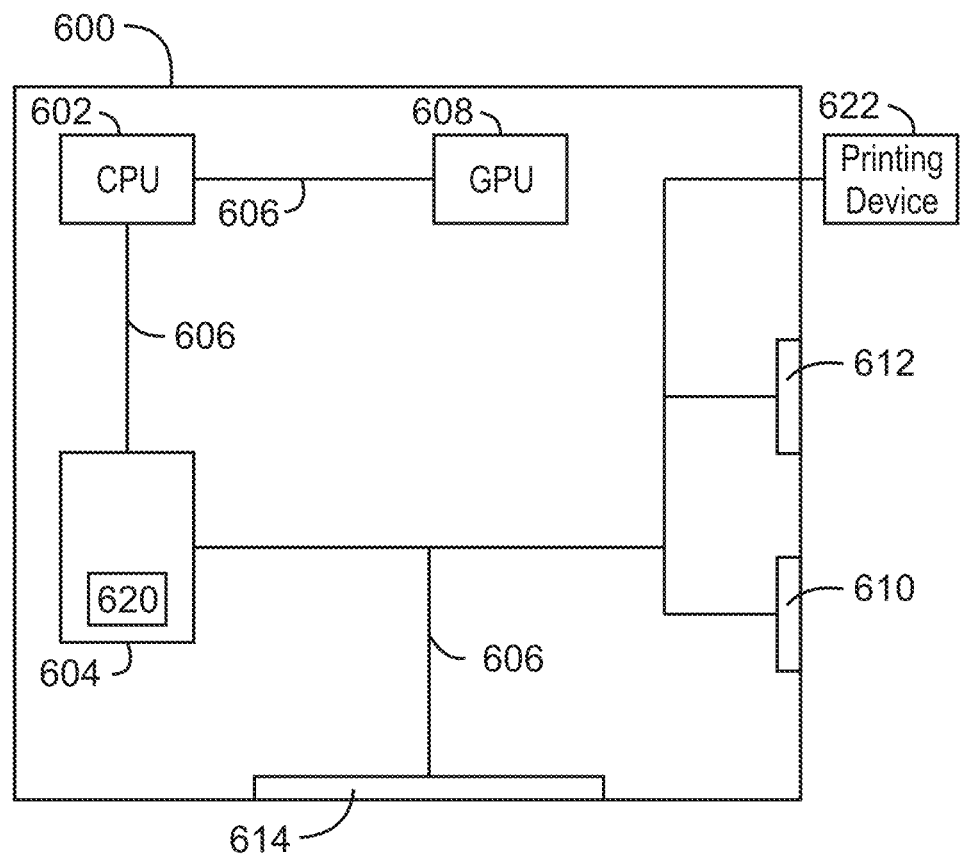
FIG. 6 is a block diagram of an electronic device that may be used in accordance with embodiments.

FIG. 6 is a block diagram of an electronic device that may be used in accordance with embodiments. The electronic device 600 may be virtually any electronic device, including, for example, printing device, a camera, laptop or other portable or desktop computer, cellular or other mobile telephone, etc. Electronic device 600 may include a central processing unit (CPU) 602, memory 604, signal bus 606, graphics processing unit (GPU) 608, image capture mechanism 610, sensor 612, display 614, CPU 602 may be configured to read, via signal bus 606, and execute applications 620 that may be stored in memory 604. The CPU 602 may be a single, dual, or multi-core processor or any other suitable processing device. Memory 604 may include random access memory (RAM), read only memory (ROM), a hard disk or solid-state drive, flash memory, or other suitable types of memory. Memory 604 stores applications 620.

Signal bus 606 interconnects CPU 602, memory 604, GPU 608, image capture mechanism 608, image capture mechanism 610, sensor 612 and display 614, and enables the transfer of electronic signals and data among and between same.

GPU 608 may be any suitable GPU processor, and may be configured to perform any number of graphics operations, such as, for example, rendering or manipulating graphics images, frames, videos, or the like, for display on display 614 or another display to a user of device 600. In some embodiments, GPU 608 may include a number of graphics engines (not shown) that may be configured to perform specific graphics tasks.

Image capture mechanism 610 may be configured to capture a 3-D image. Image capture mechanism 610 may be configured as a camera, stereoscopic camera, infrared sensor or other image capture mechanism. Image capture mechanism 610 is configured to capture depth and image texture information associated with the captured 3-D image. In examples, alternatively, sensor 612 may be configured to capture the depth and image texture information of the captured image, and thus may be configured as a charge-coupled device image sensor, a system-on-chip sensor image sensor, or other suitable sensor or combination of sensors. Applications 620 may encode the depth and image texture information in a 3-D depth map or surface mesh, such as surface mesh 200, in a currently-existing or future developed standardized media CODEC.

Display 614 may be configured as a flat panel liquid crystal or other display device configured to display the captured image to a user, and may be further configured to display a graphical or human-machine interface to a user for control and operation of device 600. Display 614 may be integral with or separate from device 600.

Applications 620 include instructions sufficient to perform method 300. For example, applications 620 may include instructions to capture or otherwise obtain or receive a 3-D image, to extract depth and texture information or otherwise determine the depth and texture maps of the 3-D image, to generate a surface mesh module of the 3-D image, determine texture sections of the image corresponding to the surface mesh sections, to rank the surfaces in regard to at least one of color intensity and specular reflection, to determine the light source vector(s) to thereby locate the light source in 3-D space, and to adjust the characteristics of the light source(s) of the 3-D image, as is more particularly described above in regard to method 300. Applications 620 may also include instructions to output an enhanced image and data associated therewith, such as a set of color-intensity ranked surfaces and textures associated with the 3-D image.

Electronic device 600 may, in some embodiments, include printing device 622, such as a printer, fax machine, and other printing devices, that can print the encoded 3-D surface mesh, such as surface mesh 200, and the corresponding texture sections. Printing device 622 may be integral with or external to electronic device 600. Applications 620 may include the instructions necessary to interface with and drive the printing device 622.

The block diagram of FIG. 6 is not intended to indicate that the device 600 is to include all of the components shown in FIG. 6. Further, the device 600 may include any number of additional components not shown in FIG. 6, depending on the details of the specific implementation.

Figure 7:
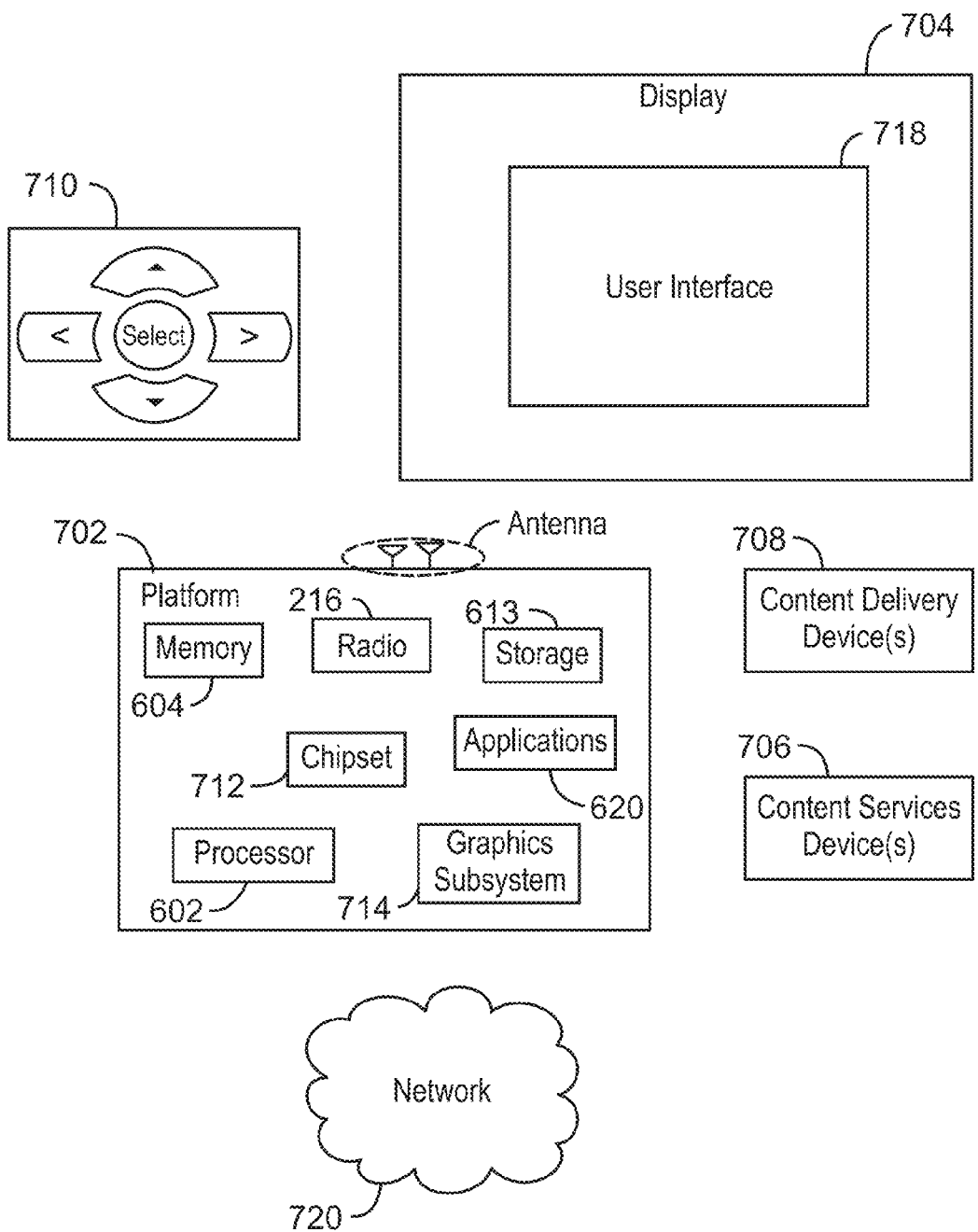
FIG. 7 is a block diagram of an exemplary system for encoding images using a 3D mesh of polygons and corresponding textures, in accordance with embodiments.

FIG. 7 is a block diagram of an exemplary system 700 for encoding images using a 3D mesh of polygons and corresponding textures, in accordance with embodiments. Like numbered items are as described with respect to FIG. 6. In some embodiments, the system 700 is a media system. In addition, the system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 700 comprises a platform 702 coupled to a display 704. The platform 702 may receive content from a content device, such as content services device(s) 706 or content delivery device(s) 708, or other similar content sources. A navigation controller 710 including one or more navigation features may be used to interact with, for example, the platform 702 and/or the display 704. Each of these components is described in more detail below.

The platform 702 may include any combination of a chipset 712, a central processing unit (CPU) 602, a memory device 604, a storage device 713, a graphics subsystem 714, applications 620, and a radio 716. The chipset 712 may provide intercommunication among the CPU 602, the memory device 604, the storage device 713, the graphics subsystem 714, the applications 620, and the radio 714.

The CPU 602 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 602 includes dual-core processor(s), dual-core mobile processor(s), or the like.

The memory device 604 may be implemented as a volatile memory device such as, but not limited to, a Random Access Memory (RAM), Dynamic Random Access Memory (DRAM), or Static RAM (SRAM). The storage device 713 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 713 includes technology to increase the storage performance enhanced protection for valuable digital media when multiple hard drives are included, for example.

The graphics subsystem 714 may perform processing of images such as still or video for display. The graphics subsystem 714 may include a graphics processing unit (GPU), such as the GPU 608, or a visual processing unit (VPU), for example. An analog or digital interface may be used to communicatively couple the graphics subsystem 714 and the display 704. For example, the interface may be any of a High-Definition Multimedia Interface, DisplayPort, wireless HDMI, and/or wireless HD compliant techniques. The graphics subsystem 714 may be integrated into the CPU 602 or the chipset 712. Alternatively, the graphics subsystem 714 may be a stand-alone card communicatively coupled to the chipset 712.

The graphics and/or video processing techniques described herein may be implemented in various hardware architectures. For example, graphics and/or video functionality may be integrated within the chipset 712. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 716 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 716 may operate in accordance with one or more applicable standards in any version.

The display 704 may include any television type monitor or display. For example, the display 704 may include a computer display screen, touch screen display, video monitor, television, or the like. The display 704 may be digital and/or analog. In some embodiments, the display 704 is a holographic display. Also, the display 704 may be a transparent surface that may receive a visual projection. Such projections may convey various forms of information, images, objects, or the like. For example, such projections may be a visual overlay for a mobile augmented reality (MAR) application. Under the control of one or more applications 620, the platform 702 may display a user interface 718 on the display 704.

The content services device(s) 706 may be hosted by any national, international, or independent service and, thus, may be accessible to the platform 702 via the Internet, for example. The content services device(s) 706 may be coupled to the platform 702 and/or to the display 704. The platform 702 and/or the content services device(s) 706 may be coupled to a network 720 to communicate (e.g., send and/or receive) media information to and from the network 720. The content delivery device(s) 708 also may be coupled to the platform 702 and/or to the display 704.

The content services device(s) 706 may include a cable television box, personal computer, network, telephone, or Internet-enabled device capable of delivering digital information. In addition, the content services device(s) 706 may include any other similar devices capable of unidirectionally or bidirectionally communicating content between content providers and the platform 702 or the display 704, via the network 720 or directly. It will be appreciated that the content may be communicated unidirectionally and/or bidirectionally to and from any one of the components in the system 700 and a content provider via the network 720. Examples of content may include any media information including, for example, video, music, medical and gaming information, and so forth.

The content services device(s) 706 may receive content such as cable television programming including media information, digital information, or other content. Examples of content providers may include any cable or satellite television or radio or Internet content providers, among others.

In some embodiments, the platform 702 receives control signals from the navigation controller 710, which includes one or more navigation features. The navigation features of the navigation controller 710 may be used to interact with the user interface 718, for example. The navigation controller 710 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 710 may be echoed on the display 704 by movements of a pointer, cursor, focus ring, or other visual indicators displayed on the display 704. For example, under the control of the applications 620, the navigation features located on the navigation controller 710 may be mapped to virtual navigation features displayed on the user interface 718. In some embodiments, the navigation controller 710 may not be a separate component but, rather, may be integrated into the platform 702 and/or the display 704.

The system 700 may include drivers (not shown) that include technology to enable users to instantly turn on and off the platform 702 with the touch of a button after initial boot-up, when enabled, for example. Program logic may allow the platform 702 to stream content to media adaptors or other content services device(s) 706 or content delivery device(s) 708 when the platform is turned "off." In addition, the chipset 712 may include hardware and/or software support for 6.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 700 may be integrated. For example, the platform 702 and the content services device(s) 706 may be integrated; the platform 702 and the content delivery device(s) 708 may be integrated; or the platform 702, the content services device(s) 706, and the content delivery device(s) 708 may be integrated. In some embodiments, the platform 702 and the display 704 are an integrated unit. The display 704 and the content service device(s) 706 may be integrated, or the display 704 and the content delivery device(s) 708 may be integrated, for example.

The system 700 may be implemented as a wireless system or a wired system. When implemented as a wireless system, the system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 8:
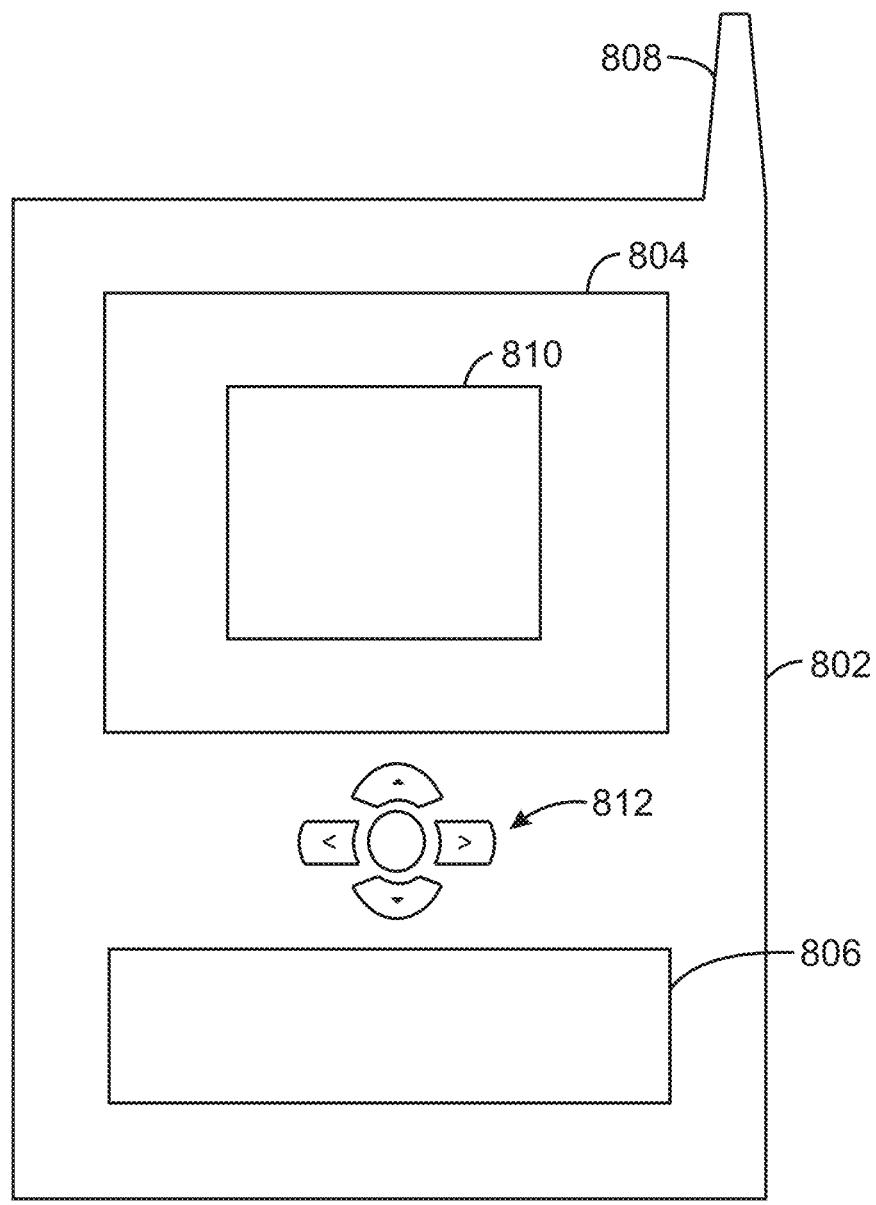
FIG. 8 is a schematic of a small form factor device in which the system of FIG. 7 may be embodied, in accordance with embodiments.

FIG. 8 is a schematic of a small form factor device 800 in which the system 700 of FIG. 7 may be embodied, in accordance with embodiments. Like numbered items are as described with respect to FIG. 7. In some embodiments, for example, the device 700 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 8, the device 800 may include a housing 802, a display 804, an input/output (I/O) device 806, and an antenna 808. The device 800 may also include navigation features 810. The display 804 may include any suitable display unit for displaying information appropriate for a mobile computing device. The I/O device 806 may include any suitable I/O device for entering information into a mobile computing device. For example, the I/O device 806 may include an alphanumeric keyboard, a numeric keypad, a touch pad, input keys, buttons, switches, rocker switches, microphones, speakers, a voice recognition device and software, or the like. Information may also be entered into the device 800 by way of microphone. Such information may be digitized by a voice recognition device.

In embodiments, the image capture mechanism may be a camera device that interfaces with a host processor using an interface developed according to specifications by the Mobile Industry Processor Interface (MIPI) Camera Serial Interface (CSI) Alliance. For example, the camera serial interface may be a MIPI CSI-1 Interface, a MIPI CSI-2 Interface, or MIPI CSI-3 Interface. Accordingly, the camera serial interface may be any camera serial interface presently developed or developed in the future. In embodiments, a camera serial interface may include a data transmission interface that is a unidirectional differential serial interface with data and clock signals. Moreover, the camera interface with a host processor may also be any Camera Parallel Interface (CPI) presently developed or developed in the future.

In embodiments, the image capture mechanism may be a component of a mobile computing device. For example, the camera device developed according to MIPI CSI Alliance standards may be an image capture mechanism integrated with at least one or more of the device 600 of FIG. 6, the system 700 of FIG. 7, the device 800 of FIG. 8, or any combinations thereof. The image capture mechanism may include various sensors, such as a depth sensor, an image sensor, an infrared sensor, an X-Ray photon counting sensor or any combination thereof. The image sensors may include charge-coupled device (CCD) image sensors, complementary metal-oxide-semiconductor (CMOS) image sensors, system on chip (SOC) image sensors, image sensors with photosensitive thin film transistors, or any combination thereof.

EXAMPLE 1

An apparatus for enhancing a 3-D image is described herein. The 3-D image includes depth and texture information associated therewith. The apparatus includes logic to generate, dependent at least in part upon the depth information, a 3-D mesh having surface mesh sections, and logic to determine, dependent at last in part upon the texture information, texture sections corresponding to the surface mesh sections. The apparatus also includes logic to rank the texture sections and corresponding surface mesh sections dependent at least in part upon a color intensity of the texture sections, and logic to adjust the characteristics of one or more light sources to alter the color intensity of one or more of the color-intensity ranked texture sections to thereby produce an enhanced image.

A location of the one or more light sources may be determined, and the one or more light sources may be added to the 3-D image after it is captured. The one or more light sources may also be present in the 3-D image when it is captured. Logic to determine the location of the one or more light sources may include determining, dependent at least in part upon the ranked color-intensity of image textures and the corresponding surface mesh normal vectors, the position of light sources in the 3-D image using one or more light source vectors. Logic to determine the one or more light source vectors may also include determining, for each of a plurality of color-intensity ranked texture sections, a corresponding light source vector, and mathematically combining a set of the light source vectors. The color intensity of the plurality of color-intensity ranked texture sections may include texture sections having a color intensity that is one of less than and greater than a predetermined threshold. Logic to determine the light source vector may include determining a half-way vector, the half-way vector being approximately half-way between a viewing vector and a vector normal for each of the one or more color-intensity ranked texture sections and surface mesh sections and the corresponding surface vectors. Logic to adjust the characteristics of the at least one light source may include changing at least one of the brightness, color, hue, saturation, chroma, lightness, color intensity and luminance of one or more of the at least one light source. Logic to adjust the characteristics of the at least one light source may also include one of adding and removing at least one light source. The surface mesh and corresponding textures may be re-rendered using new light sources, and the resulting image may also be output. Re-rendering the surface mesh and the corresponding textures and outputting the resulting image may include providing at least one of the color-intensity ranked surfaces in a predetermined standard format, a standard depth map format, or a standard camera output format. Logic to adjust the characteristics of the at least one light source may be performed prior to or in conjunction with a rendering of the enhanced image. Further, the apparatus may be a printing device or an image capture mechanism.

EXAMPLE 2

At least one non-transitory machine readable medium having instructions stored therein is described, The instructions, in response to being executed on a device, cause the device to extract depth and texture information associated with a 3-D image and generate from the depth information a surface mesh having surface mesh sections. The instructions, in response to being executed on a device, cause the device to determine from the texture information texture sections corresponding to the surface mesh sections, and rank the texture sections and corresponding surface mesh sections in terms of their respective color intensity. Additionally, in response to being executed on a device, cause the device to adjust the characteristics of one or more light sources to thereby alter the color intensity of one or more of the color-intensity ranked texture sections to produce an enhanced image.

The instructions to adjust the characteristics of the at least one light source may include instructions to add or remove one or more light sources to the 3-D image. The instructions to adjust, add or remove the characteristics of the one or more light sources may also include instructions to adjust, add or remove the characteristics of a light source present in the 3-D image when captured. The location of the at least one light source may be determined. The instructions to determine the location of the one or more light sources may further include instructions that, in response to being executed on the device, determine for each of a plurality of color-intensity ranked texture sections a corresponding light source vector for corresponding surface mesh sections, and mathematically together the light source vectors. The plurality of color-intensity ranked texture sections may include texture sections having a color intensity that is one of less than and greater than a predetermined threshold. The instructions to adjust, add or remove the characteristics of the at least one light source may further include instructions that, when executed on the device, change at least one of the brightness, color, hue, saturation, chroma, lightness, color intensity and luminance of one or more of the at least one light source. The instructions to adjust the characteristics of the at least one light source may further include instructions that, when executed on the device, add or remove at least one light source.

The non-transitory machine readable medium may also include instructions that, when executed on the device, re-renders the surface mesh and corresponding textures using new light sources and outputs the enhanced image. The instructions to output the enhanced image may further include instructions that, when executed on the device, also provides at least one of the color-intensity ranked surfaces in a predetermined standard format, a standard depth map format, a standard camera output format, a standard media codec format, a standard computer graphics format, a standard 3D depth file format, or a standard protocol format between cameras, sensors, 2D or 3D printers, 2D or 3D displays, computer graphics systems, or computer systems.

EXAMPLE 3

A system is described herein. The system includes a central processing unit configured to execute stored instructions and at least one memory device storing instructions readable by the central processing unit that, when executed by the central processing unit, are configured to extract depth and texture information from a 3-D image and generate from the depth information a surface mesh having surface mesh sections. The system may also include instructions that, when executed, are configured to determine from the texture information texture sections corresponding to the surface mesh sections, rank the texture sections in terms of their respective color intensity, and adjust, add or remove a characteristic of one or more light sources to thereby alter the color intensity of the one or more of the color-intensity ranked texture sections to thereby produce an enhanced image.

The system may further include at least one sensor configured to capture a 3-D image and the associated depth and texture information. The instructions are further configured to determine the location of the one or more light sources. The instructions may also be configured to determine for each of a plurality of color-intensity ranked texture sections having a color intensity that is one of less than and greater than a predetermined threshold a corresponding light source vector, and to mathematically combine together the light source vectors to thereby determine the location of the one or more light sources. The instructions may also be configured to adjust the characteristics of the at least one light source modifies at least one of the brightness, color, hue, saturation, chroma, lightness, color intensity and luminance of one or more of the one or more light sources.

Additionally, the instructions may be configured to adjust the characteristics of the one or more light sources are further configured to add additional light sources and remove existing light sources. The instructions may be further configured to output the color-intensity ranked surfaces in a predetermined standard format, a standard depth map format, a standard camera output format, a standard media codec format, a standard computer graphics format, a standard 3D depth file format, or a standard protocol format between cameras, sensors, 2D or 3D printers, 2D or 3D displays, computer graphics systems, or computer systems.

It is to be understood that, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for enhancing a three-dimensional (3-D) image, the 3-D image having depth and texture information associated therewith, the apparatus comprising logic, at least partially hardware logic, to:
    generate, dependent at least in part upon the depth information, a 3-D mesh having surface mesh sections;
    determine, dependent at least in part upon the texture information, texture sections corresponding to the surface mesh sections, wherein the texture sections having higher levels of color intensity correspond to the surface mesh sections having higher levels of specular reflection, and the texture sections having lower levels of color intensity correspond to the surface mesh sections having lower levels of specular reflection;
    rank the texture sections and corresponding surface mesh sections based on the color intensity of the texture sections and the specular reflection of the corresponding surface mesh sections;
    determine light source vectors for a selected plurality of the color-intensity ranked texture sections to thereby determine a location of one or more light sources in the 3-D image, wherein the plurality of the color-intensity ranked texture sections is selected based on the ranking of the texture sections; and
    adjust a characteristic of the one or more light sources to alter the color intensity of one or more of the color-intensity ranked texture sections to thereby produce an enhanced image.

2. The apparatus of claim 1, wherein logic to determine the location of the one or more light sources comprises determining, dependent at least in part upon the ranked color-intensity of image textures and corresponding surface mesh normal vectors, the position of light sources in the 3-D image using one or more light source vectors.

3. The apparatus of claim 2, wherein logic to determine the one or more light source vectors comprises determining for each of the plurality of color-intensity ranked texture sections a corresponding light source vector, and mathematically combining together each light source vector from each of the plurality of color-intensity ranked texture sections.

4. The apparatus of claim 3, wherein the color intensity of the plurality of color-intensity ranked texture sections comprises texture sections having a color intensity that is one of less than and greater than a predetermined threshold.

5. The apparatus of claim 2, wherein logic to determine the one or more light source vectors comprises determining a half-way vector, the half-way vector being approximately half-way between a viewing vector and a vector normal, for each of the plurality of color-intensity ranked texture sections and surface mesh sections and the corresponding surface normal vectors.

6. The apparatus of claim 1, wherein the one or more light sources are added to the 3-D image after it is captured.

7. The apparatus of claim 1, wherein the one or more light sources are present in the 3-D image when it is captured.

8. The apparatus of claim 1, wherein logic to adjust the characteristics of the at least one light source comprises changing at least one of a brightness, color, hue, saturation, chroma, lightness, color intensity and luminance of one or more of the at least one light source.

9. The apparatus of claim 8, wherein logic to adjust the characteristics of the at least one light source comprises one of adding and removing at least one light source.

10. The apparatus of claim 1, further comprising logic to re-render the 3-D mesh and corresponding textures using new light sources and outputting the resulting image.

11. The apparatus of claim 10, wherein re-rendering the surface mesh and corresponding textures and outputting the resulting image comprises providing at least one of a color-intensity ranked surface in a predetermined standard format, a standard depth map format, or a standard camera output format.

12. The apparatus of claim 1, wherein logic to adjust the characteristics of the at least one light source is performed prior to or in conjunction with a rendering of the enhanced image.

13. The apparatus of claim 1, wherein the apparatus is a printing device.

14. The apparatus of claim 1, wherein the apparatus is an image capture mechanism.

15. At least one non-transitory machine readable medium having instructions stored therein that, in response to being executed on a device, cause the device to:
    extract depth and texture information associated with a three-dimensional (3-D) image;
    generate from the depth information a surface mesh having surface mesh sections;
    determine from the texture information texture sections corresponding to the surface mesh sections, wherein the texture sections having higher levels of color intensity correspond to the surface mesh sections having higher levels of specular reflection, and the texture sections having lower levels of color intensity correspond to the surface mesh sections having lower levels of specular reflection;
    rank the texture sections and corresponding surface mesh sections based on the color intensity and the specular reflection;
    determine light source vectors for a selected plurality of the color-intensity ranked texture sections to thereby determine a location of one or more light sources in the 3-D image, wherein the plurality of the color-intensity ranked texture sections is selected based on the ranking of the texture sections; and
    adjust a characteristic of the one or more light sources to thereby alter the color intensity of one or more of the color-intensity ranked texture sections to produce an enhanced image.

16. The non-transitory machine readable medium of claim 15, wherein the instructions to adjust the characteristics of the at least one light source includes instructions to add or remove one or more light sources to the 3-D image.

17. The non-transitory machine readable medium of claim 15, wherein the instructions to adjust the characteristics of the at least one light source includes instructions to adjust, add or remove the characteristics of one or more light sources present in the 3-D image when captured.

18. The non-transitory machine readable medium of claim 15, wherein the instructions to determine the location of the one or more light sources further comprise instructions that, in response to being executed on the device, determine for each of the plurality of color-intensity ranked texture sections a corresponding light source vector for corresponding surface mesh sections, and mathematically combine each light source vector from each of the plurality of color-intensity ranked texture sections.

19. The non-transitory machine readable medium of claim 18, wherein the plurality of color-intensity ranked texture sections comprises texture sections having a color intensity that is one of less than and greater than a predetermined threshold.

20. The non-transitory machine readable medium of claim 15, wherein the instructions to adjust, add or remove the characteristics of the at least one light source further comprise instructions that, when executed on the device, change at least one of a brightness, color, hue, saturation, chroma, lightness, color intensity and luminance of one or more of the at least one light source.

21. The non-transitory machine readable medium of claim 20, wherein the instructions to adjust the characteristics of the at least one light source further comprise instructions that, when executed on the device, add or remove at least one light source.

22. The non-transitory machine readable medium of claim 15, further comprising instructions that, when executed on the device, re-renders the surface mesh and corresponding textures using new light sources and outputs the enhanced image.

23. The non-transitory machine readable medium of claim 22, wherein the instructions to output the enhanced image further comprise instructions that, when executed on the device, also provides at least one of a color-intensity ranked surface in a predetermined standard format, a standard depth map format, a standard camera output format, a standard media codec format, a standard computer graphics format, a standard 3D depth file format, or a standard protocol format between cameras, sensors, two-dimensional (2D) or 3-D printers, 2D or 3-D displays, computer graphics systems, or computer systems.

24. A system, comprising:
    a central processing unit configured to execute stored instructions; and
    at least one memory device storing instructions readable by the central processing unit that, when executed by the central processing unit, are configured to:
    extract depth and texture information from a three-dimensional (3-D) image;
    generate from the depth information a surface mesh having surface mesh sections;
    determine from the texture information texture sections corresponding to the surface mesh sections, wherein the texture sections having higher levels of color intensity correspond to the surface mesh sections having higher levels of specular reflection, and the texture sections having lower levels of color intensity correspond to the surface mesh sections having lower levels of specular reflection;
    rank the texture sections and corresponding surface mesh sections based on the color intensity and the specular reflection;
    determine light source vectors for a selected plurality of the color-intensity ranked texture sections to thereby determine a location of one or more light sources in the 3-D image, wherein the plurality of the color-intensity ranked texture sections is selected based on the ranking of the texture sections; and
    adjust, add, or remove a characteristic of the one or more light sources to thereby alter the color intensity of the one or more of the color-intensity ranked texture sections to thereby produce an enhanced image.

25. The system of claim 24, wherein the system further comprises at least one sensor configured to capture a 3-D image and the associated depth and texture information.

26. The system of claim 24, wherein the instructions are further configured to determine for each of the plurality of color-intensity ranked texture sections having a color intensity that is one of less than and greater than a predetermined threshold a corresponding light source vector, and to mathematically combine together each light source vector from each of the plurality of color-intensity ranked texture sections to thereby determine the location of each of the light source.

27. The system of claim 24, wherein the instructions configured to adjust the characteristics of the at least one light source modifies at least one of the brightness, color, hue, saturation, chroma, lightness, color intensity and luminance of the one or more light sources.

28. The system of claim 27, wherein the instructions configured to adjust the characteristics of the one or more light sources are further configured to add additional light sources and remove existing light sources.

29. The system of claim 24, wherein the instructions are further configured to output a color-intensity ranked surface in a predetermined standard format, a standard depth map format, a standard camera output format, a standard media codec format, a standard computer graphics format, a standard 3-D depth file format, or a standard protocol format between cameras, sensors, two-dimensional (2D) or 3-D printers, 2D or 3-D displays, computer graphics systems, or computer systems.

* * * * *